(12) United States Patent
Elliott

(10) Patent No.: US 7,627,901 B1
(45) Date of Patent: Dec. 1, 2009

(54) SYSTEMS AND METHODS FOR IMPROVED MEDIA ACCESS CONTROL

(75) Inventor: Brig Barnum Elliott, Arlington, MA (US)

(73) Assignee: Verizon Corporate Services Group Inc. & BBN Technologies Corp., Basking Ridge, NJ (US)

( * ) Notice: Subject to any disclaimer, the term of this patent is extended or adjusted under 35 U.S.C. 154(b) by 513 days.

(21) Appl. No.: 10/804,192

(22) Filed: Mar. 19, 2004

(51) Int. Cl.
*G06F 7/04* (2006.01)
*G06F 11/30* (2006.01)
*H04B 1/06* (2006.01)
*G01R 31/08* (2006.01)
*H04M 7/00* (2006.01)
*H04L 9/32* (2006.01)
*G09C 1/00* (2006.01)

(52) U.S. Cl. .................. 726/26; 713/187; 370/236; 455/26.1

(58) Field of Classification Search .............. 726/26; 455/26.1; 713/187
See application file for complete search history.

(56) References Cited

U.S. PATENT DOCUMENTS 6,546,001 B1 * 4/2003 Semper et al. ............. 370/349
7,154,854 B1 * 12/2006 Zweig et al. ............... 370/236

FOREIGN PATENT DOCUMENTS

GB    2432278 A  *  5/2007

OTHER PUBLICATIONS

Agrawal, G.; Chen, B.; Zhao, W.; Davari, S.; "Guaranteeing synchronous message deadlines with the timed token medium access control protocol" ,Computers, IEEE Transactions on vol. 43, Issue 3, Mar. 1994, pp. 327-339.*
Wireless LAN (Local Area Network) Medium Access Control (MAC) and Physical Layer (PHY) Specifications, ANSI/IEEE Standard 802.11, 1999, pp. 34-51 and 59-69.
Diffie-Hellman Key Exchange, "The Oakley Key Determination Protocol," RFC-2412, Nov. 1998, H. Orman.
Internet Key Exchange (IKE), RFC-2409, Nov. 1998, D. Harkins et al.
Specification for the "Advanced Encryption Standard (AES)", Federal Information Processing Standards Publication 197, Nov. 26, 2001.
Applied Cryptography, Second Edition, Chapter 22, pp. 513-522, Bruce Schneier, 1996.
Diffie-Hellman Key Exchange—A Non-Mathematician's Explanation, Keith Palmgren

* cited by examiner

*Primary Examiner*—Emmanuel L Moise
*Assistant Examiner*—Courtney D Fields

(57) ABSTRACT

Systems and methods are disclosed for controlling medium access. In one embodiment, the method includes receiving a first message including a first integer; sending a second message including a second integer, the second message sent in response to the first message; receiving a third message including data and a third integer, the third integer serving to authenticate the third message; and sending, in response to the third message, a fourth message including a fourth integer, the fourth message serving to acknowledge receipt of the third message.

23 Claims, 12 Drawing Sheets

SYSTEMS AND METHODS FOR IMPROVED MEDIA ACCESS CONTROL

BACKGROUND OF THE INVENTION

I. Field of the Invention

The present invention generally relates to communication systems and, in particular, to systems and methods for medium access control on a wireless network.

II. Background Information

Currently, a data processor, such as a computer, can communicate over a wireless medium using a variety of protocols. One such protocol is defined by Wireless LAN [Local Area Network] Medium Access Control (MAC) and Physical Layer (PHY) Specifications, ANSI/IEEE Standard 802.11, 1999 (referred to herein as "802.11-1999") and its supplements, such as Wireless LAN Medium Access Control (MAC) and Physical Layer (PHY) Specifications: Higher Speed Physical Layer Extension in the 2.4 GHz Band, IEEE Standard 802.11b, 1999 (referred to herein as "802.11b"). IEEE 802.11-1999 and its supplements are collectively referred to as "IEEE 802.11." Using IEEE 802.11, a computer can send data to or receive data from another computer (or processor) over a wireless media.

FIG. 14 depicts an exemplary known wireless message exchange between two computers labeled A and B. Referring to FIG. 14, to send data, computer A first sends a Request To Send (RTS) message to computer B. If computer B receives the RTS message and is willing to accept data from computer A, computer B sends a Clear To Send (CTS) message over a wireless media (e.g., air) which forms a network. When computer A receives the CTS message, it responds by sending data to computer B. Computer B may then send an Acknowledgement (ACK) message once it has received the data sent by computer A. Computer B may further process the data locally or may forward the data to another network, computer, and/or processor. Moreover, the message sequence depicted in FIG. 14 may occur whenever computer A has data for computer B. Furthermore, computer B may initiate a similar message sequence by sending a RTS message to computer A. The message exchange thus serves to control access to the transmission medium. With the aforementioned message exchange, another computer (not shown) can interpose itself between computers A and B and intercept one or more of the messages exchanged between computers A and B. When this is the case, computers A and B are not exchanging messages. Instead, computers A and B are exchanging messages with the interloping computer. Moreover, computers A and B may not be aware of the disruption in communication and security caused by the interloping computer. This form of interloping may be accomplished even when computers A and B are encrypting their communications, e.g., by the interloper recording and playing back encrypted messages. Such forms of attack are sometimes termed "replay attacks." Accordingly, systems and methods are needed that improve security and, in particular, provide a mechanism for protecting the media access control message sequence from disruption.

SUMMARY OF THE INVENTION

Accordingly, the present invention is directed to systems and methods for media access control on a wireless network. More particularly, the present invention is directed to improving security on a wireless network by including a nonce value in one or more of the medium access control messages to reduce the likelihood of communications disruption.

Systems and methods consistent with the present invention may receive a first message including a first integer; send a second message including a second integer, the second message sent in response to the first message; receive a third message including data and a third integer, the third integer serving to authenticate the third message; and send, in response to the third message, a fourth message including a fourth integer, the fourth message serving to acknowledge receipt of the third message.

In another embodiment, systems and methods consistent with the present invention receive a request to send message, the request to send message including a first integer; send, in response to the received request to send message, a clear to send message including the first integer and a second integer; receive a data message including the second integer, the second integer serving to authenticate the data message; and send, in response to the received data message, an acknowledgement message including the first integer.

Additional features and advantages of the invention will be set forth in part in the description that follows or may be learned by practice of the invention. The features and advantages of the invention may be realized and attained by the system and method particularly described in the written description, the appended drawings, and the claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Systems and methods consistent with the present invention may exchange messages, such as medium access control (MAC) messages, wherein each of the messages includes a nonce value or a value that is a function of the nonce value. A used herein a "nonce" is a value that is used for a present or particular occasion, i.e., a value used for particular message transmission(s). By including a nonce value in a MAC message, disruptions to communications caused by "replay" attacks can be reduced. A replay attack occurs when an interloping computer interposes itself between two computers and intercepts one or more messages. Later, the interloping computer replays the intercepted message, such that communications are disrupted between computers A and B. This form of attack may be successful even if the interloping computer cannot interpret the contents of the messages that it is replaying (e.g., even when the messages are encrypted). The nonce value in each of the MAC messages serves to reduce the likelihood that such a "replay" disruption can succeed.

Figure 1:
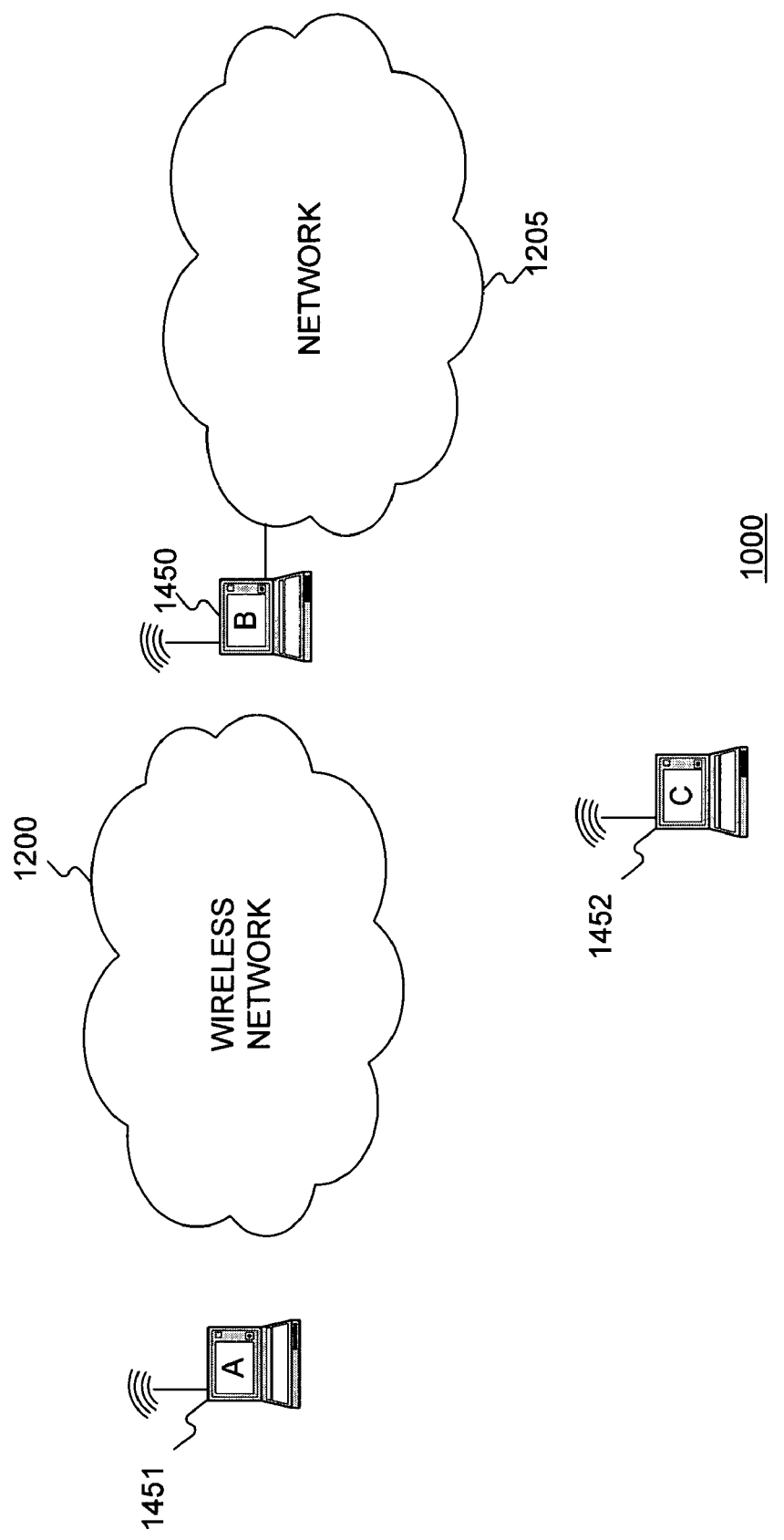
FIG. 1 illustrates an exemplary system environment in accordance with systems and methods consistent with the present invention.

FIG. 1 shows an exemplary system environment 1000 consistent with the system and methods of the present invention. Referring to FIG. 1, the system environment includes a first computer labeled A 1451, a second computer labeled B 1450, a third computer labeled computer C 1452 a wireless network 1200, and another network 1205. Computer A 1451 communicates wirelessly with computer B 1450 over wireless network 1200. Computer C 1452 can also communicate wirelessly with computer A 1450 and/or computer B 1451.

Figure 2:
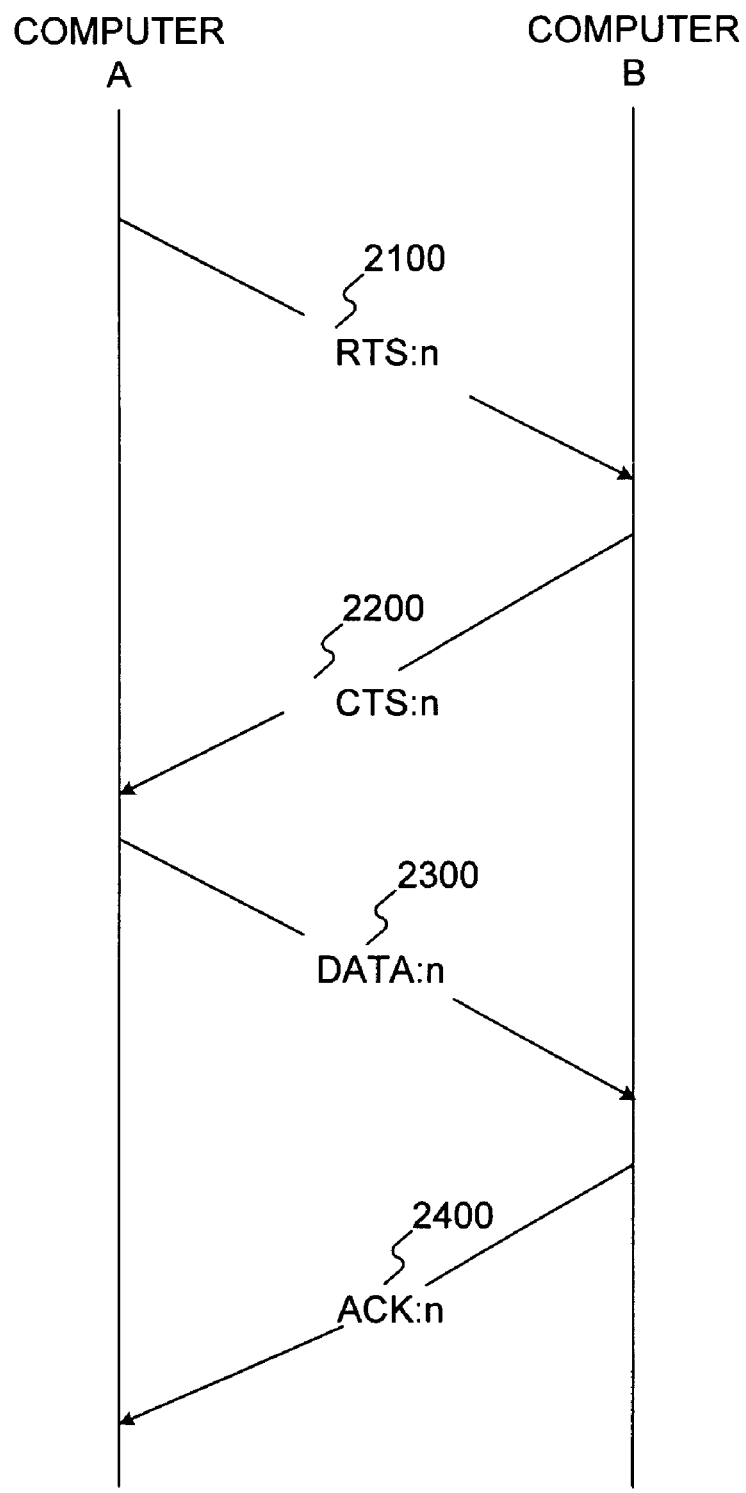
FIG. 2 is a diagram depicting an exemplary message exchange between two computers in accordance with systems and methods consistent with the present invention.

In the exemplary embodiment depicted in FIG. 2, there is depicted an exemplary message exchange between computer A 1451 and computer B 1450 when computer A 1451 has data to send to computer B 1450. Referring to FIGS. 1 and 2, computer A 1451 sends an RTS message 2100 over wireless network 1200. RTS message 2100 includes a nonce value labeled n, which is described in greater detail below. After computer B 1450 receives RTS message 2100, computer B 1450 replies with a CTS message 2200 that includes the same nonce value n. Computer A 1451 may then send Data message 2300 to computer B 1450. Data message 2300 includes a data payload portion that may (or may not) be encrypted and the nonce value n. Computer B then responds with ACK message 2400 that also includes the nonce value n.

The exemplary message sequence of FIG. 2 may be effective at preventing a "replay" attack. In a replay attack, computer C 1452 may record a wireless transmission and simply replay it later-disrupting communications between computer A 1451 and computer B 1450. Even if the Data message 2300 is encrypted, a replay attack can disrupt communications between computers A and B. However, a message exchange consistent with the above embodiment of the present invention uses a nonce value to protect against such attacks. As noted above, the nonce value is a value that is used for a present or particular occasion, i.e., a value used for particular message transmission(s) depicted in FIG. 2. For example, the same nonce value, such as a random number between 0 and 64,999, can be used in each of the set of messages 2100-2400. When a subsequent set of messages occurs (not shown), another nonce value may be used instead.

Any value may be used as the nonce value. For example, a random number may be used as the nonce value. As used herein a random number may be truly, physically random. There are many techniques known to one of ordinary skill in the art for finding physically random numbers, including measurement of thermal noise in electronics. Alternatively, the random number may be pseudorandom, i.e., be calculated by an algorithm but having a resulting sequence that is difficult to predict. The nonce value "n" may simply be based on the Global Positioning System (GPS) time when RTS message 2100 is sent. When that is the case, the other messages 2200-2400 use the same GPS time nonce value. By using a nonce value that changes for a particular set of messages 2100-2400, a replay type attack is likely to be detected. For example, if a GPS time value were used as the nonce value "n", a replay attack would be readily detected since a replayed and retransmitted Data message, sent by an interloper (e.g., computer C 1452), would more than likely include the wrong nonce (e.g., GPS time). Similarly, if a random value between 1 and 64,999 were used for each particular set of messages 2100-2400, a replayed Data message 2100 sent by computer C is likely to be detected by computers A and/or B. In this example, the interloper computer C 1452 has a 1/65000 chance of being successful in this example by guessing the correct nonce value.

Figure 3:
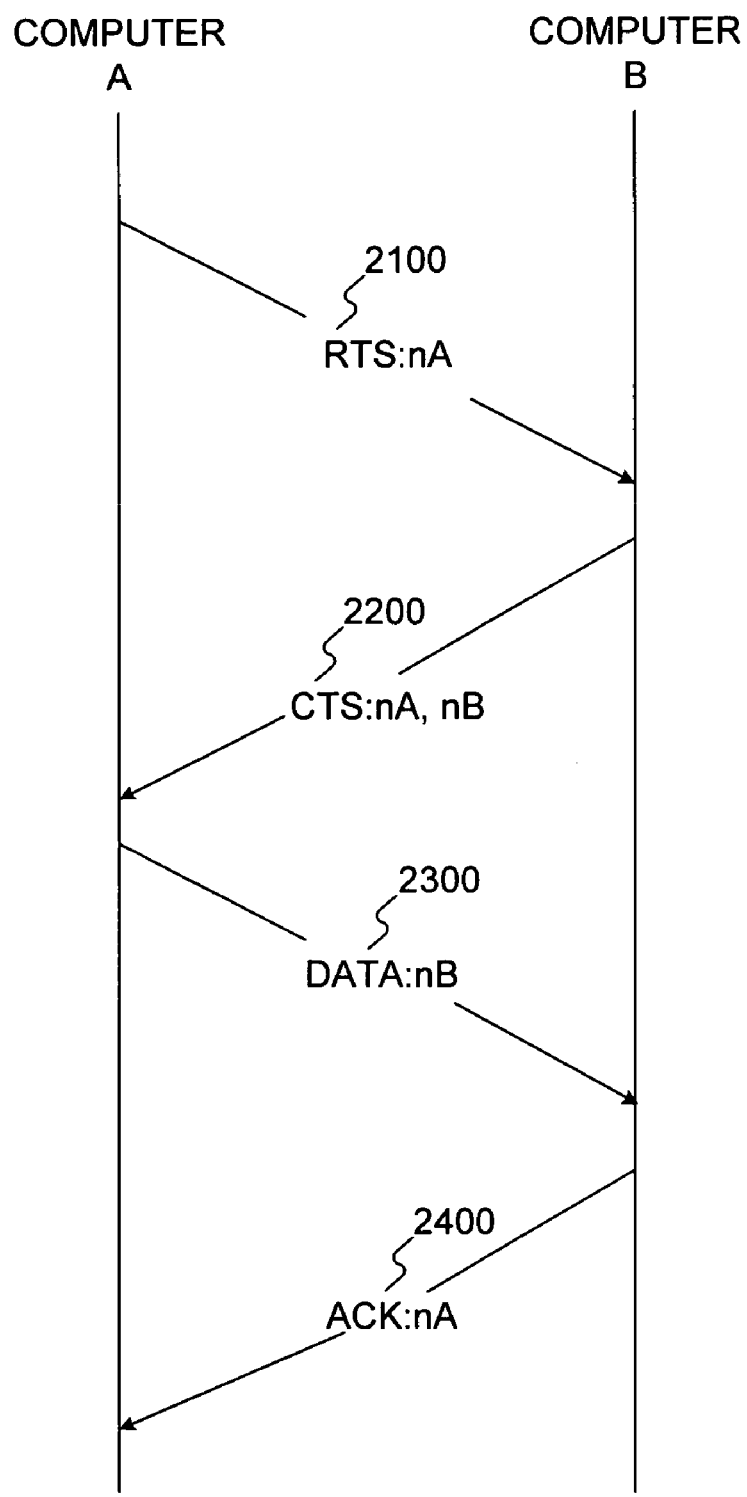
FIG. 3 is a diagram depicting another exemplary message exchange between two computers in accordance with systems and methods consistent with the present invention.

FIG. 3 depicts another exemplary message exchange consistent with the systems and methods of the present invention. Referring to FIGS. 1 and 3, computer A 1451 sends an RTS message 2100 over wireless network 1200. RTS message 2100 includes a nonce value labeled nA (e.g., a value of 54), which is generated by computer A 1451. After computer B 1450 receives RTS message 2100, computer B 1450 replies with a CTS message 2200 that includes a nonce value labeled nB (e.g., the value 1008) and the same nonce value nA (e.g., 54) received from computer A 1451. The nonce value nB (e.g., the value 1008) is, however, generated by computer 1450. In response to CTS message 2200, computer A 1451 may send Data message 2300 to computer B 1450. Data message 2300 includes a data payload portion and the nonce value labeled "nB" 2300 (e.g., 1008). Computer B then responds with ACK message 2400 that also includes nonce value nA (e.g., 54). In the above message exchange, each computer generates it own nonce value. Moreover, each computer's nonce value is sent to the other computer, which echoes back that nonce value in the subsequent response.

Figure 4:
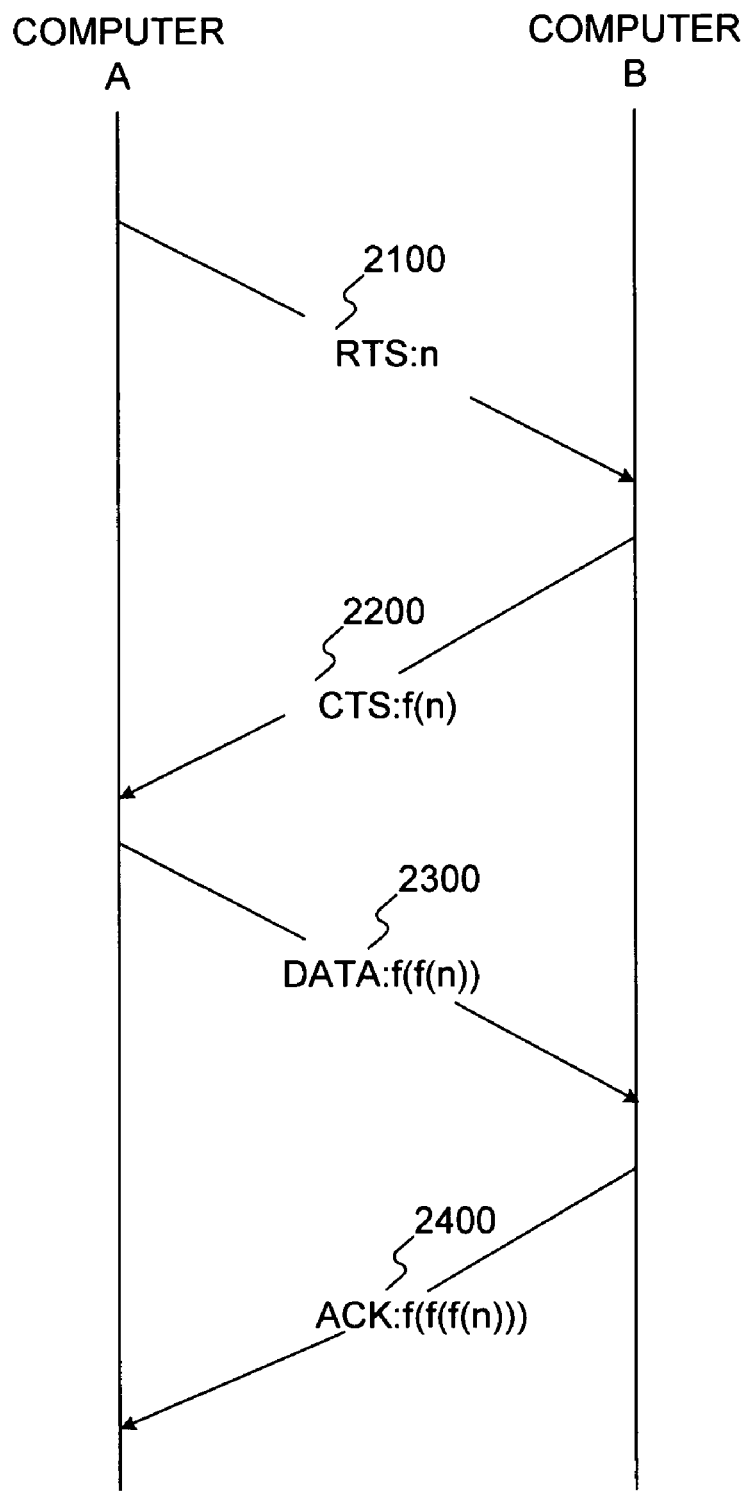
FIG. 4 is a diagram depicting another exemplary message exchange between two computers in accordance with systems and methods consistent with the present invention.

FIG. 4 depicts another exemplary message exchange between computer A 1451 and computer B 1450 consistent with the systems and methods of the present invention. Referring to FIGS. 1 and 4, computer A 1451 sends an RTS message 2100 over wireless network 1200. RTS message 2100 includes a nonce value labeled n, which is generated by computer A 1451. After computer B 1450 receives RTS message 2100, computer B 1450 replies with a CTS message 2200 that includes a nonce value labeled f(n). The nonce value f(n) represents a value generated by a function, with the function f(n) being known to both computers A and B 1450, 1451. For example, the function may be a squaring function ($x^2$). In this example, when the nonce n is equal to a value of 2, the value of f(n) is equal to a value of 4 (i.e., the square of 2). Computer A 1451 may then send Data message 2300 to computer B 1450. Data message 2300 includes a data payload portion with the nonce value labeled f(f(n)) 2300. Returning to the previous example, computer A 1451 also applies the function f to the received nonce value of 4. As such, nonce value f(f(n)) is equal to 16 (i.e., square of 4). Computer B then responds with ACK message 2400 that includes nonce value f(f(f(n))).

Returning to our previous example, computer B 1451 also applies the function f to the received nonce value of 16. As such, nonce value f(f(f(n))) is equal to 256 (i.e., square of 16). In the above message exchange, each computer generates it own nonce value. Moreover, each computers nonce value is sent to the other computer which echoes back a nonce value that is a function of the received nonce value.

Any other function may be used, such as function based on linear feedback shift registers (LFSR) with a secret key known only to computers A and B. In this exemplary embodiment consistent with the systems and methods of the present invention, computer A generates a nonce based on a value, such as, for example, a random value or a GPS time value. The nonce value is included in RTS message 2100. Computer B replies with the correct nonce value based on the received nonce value n and the function f(n). For example, computer B 1450 may concatenate a secret key with the nonce value n included in RTS message 2100. The concatenated key may be used to seed (initialize) a pseudorandom number generator (e.g., a LFSR) that determines the resulting pseudorandom integer, which is included in CTS message 2200. Computer A may determine the value f(f(n)) by concatenating its secret key with the nonce value received in CTS message 2200. The concatenated key serves to seed a pseudorandom number generator that determines the nonce value f(f(n)), which is later included in Data message 2300. Computer B may use the received nonce value f(f(n)) and concatenate it with its secret key. The concatenated key serves to seed a pseudorandom number generator that determines the resulting nonce value f(f(f(n))) (e.g., a pseudorandom integer). The nonce value is then included in ACK message 2400. By using the nonce value, it is unlikely that a replay attack by computer C 1452 will be successful in disrupting communications between computers A and B 1451, 1450.

Figure 5:
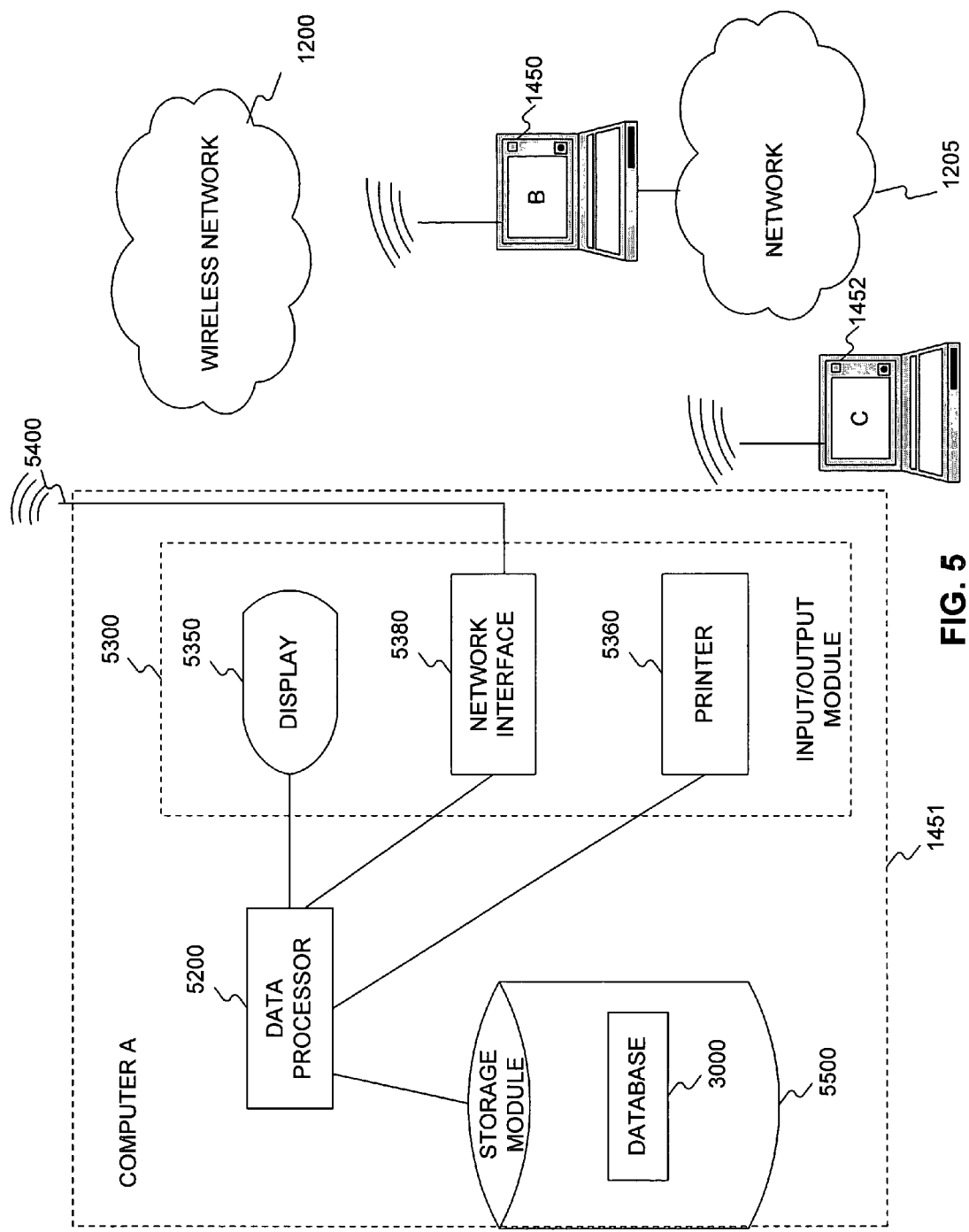
FIG. 5 illustrates another exemplary system environment in accordance with systems and methods consistent with the present invention.

FIG. 5 depicts the exemplary system environment of FIG. 1 in greater detail. Referring to FIG. 5, the system environment includes computer A 1451, computer B 1450, computer C 1452, wireless network 1200, and network 1205. Computer A further includes a data processor 5200, an input/output module 5300, a storage module 5500, and an antenna 5400. Input/output module 5300 further includes a display 5350, a network interface 5380, and a printer 5360.

Data processor 5200 may include, for example, one or more of the following: a central processing unit, a co-processor, memory, registers, or other processing devices and systems as appropriate. Although computer A 1451 is generally described in terms of data processor 5200, data processor 5200 may also be incorporated into any other processing or communication device including, for example, a wireless access point, a base station, a router, a gateway, a bridge, a handheld device, a specialized device such as a thermostat, sensor, process control device, a mobile phone, and/or a switch.

Input/output module 5300 may be implemented with a variety of devices to receive an input and/or provide an output. Some of these devices may include, for example, a keyboard, a mouse, an input storage device, display 5350, and/or printer 5360. Furthermore, input/output module 5300 may provide any input to data processor 5200 and provide any output, such as a radio frequency (RF) output for wireless transmission through antenna 5400. Network interface 5380 may permit computer A 1451 to communicate through a network, such as network 1200. For example, network interface 5380 may be embodied as an Ethernet network interface card or a wireless LAN interface card, such as the Cisco Aironet 350™, or embedded wireless LAN circuitry included in a laptop computer, or any other commercially available device compatible with a wireless standard (e.g., IEEE 802.11 or the like). Alternatively it may be embodied in an interface card suitable for use in a wireless metropolitan area network, such as the Verizon AirCard® 555.

Storage module 5500 may be embodied with a variety of components or subsystems capable of providing storage including, for example, a hard drive, an optical drive, a general-purpose storage device, a removable storage device, and/or memory. Moreover, storage module 5500 may include database 3000 for storing nonce values (and/or functions of nonce values). Although storage module 5500 is illustrated in FIG. 5 as being separate or independent from data processor 5200, storage module 5500 and data processor 5200 may be implemented as part of a single platform or system.

Antenna 5400 functions as an RF interface that permits energy to be transmitted to and/or received from another device, such a computer B. In one embodiment, antenna 5400 is coupled to network interface 5380, which includes an IEEE 802.11 wireless network interface card.

Computers B 1450 may be embodied similar to computer A 1451. In one embodiment, computer B serves as a wireless access point providing a gateway to another network 1205. Network 1205 may be a wireless network, such as a wireless network compatible with IEEE 802.11 or, alternatively, a wired network. In other embodiments, computer B 1450 does not serve as a gateway and thus functions to receive messages from and send messages to computer A 1451.

Computer C may be embodied as any computer that can interface to a network, such as a wireless network compatible with IEEE 802.11 or, alternatively, a wired network.

Network 1200 may function as a wireless communication medium that enables a wireless exchange. In one embodiment, network 1200 serves to support an IEEE 802.11 compliant wireless network (e.g., 802.11b), such that a computer configured with a wireless network interface card can exchange data based on the IEEE 802.11 standard. Although IEEE 802.11 is referred to herein, systems and methods consistent with the present invention are not limited to any particular wireless standard and may be used to enhance the security of any wired and/or wireless media access.

Network 1205 may function as a communication medium and may include, alone or in any suitable combination, a telephony-based network, a local area network (LAN), a wide area network (WAN), a dedicated intranet, the Internet, a wireless network, or a bus. Further, any suitable combination of wired and/or wireless components and systems may be incorporated into the communication channels of network 1205. Although networks 1205 and 1200 are depicted as separate, in some embodiments, networks 1205 and 1200 can be part of the same network.

Figure 6:
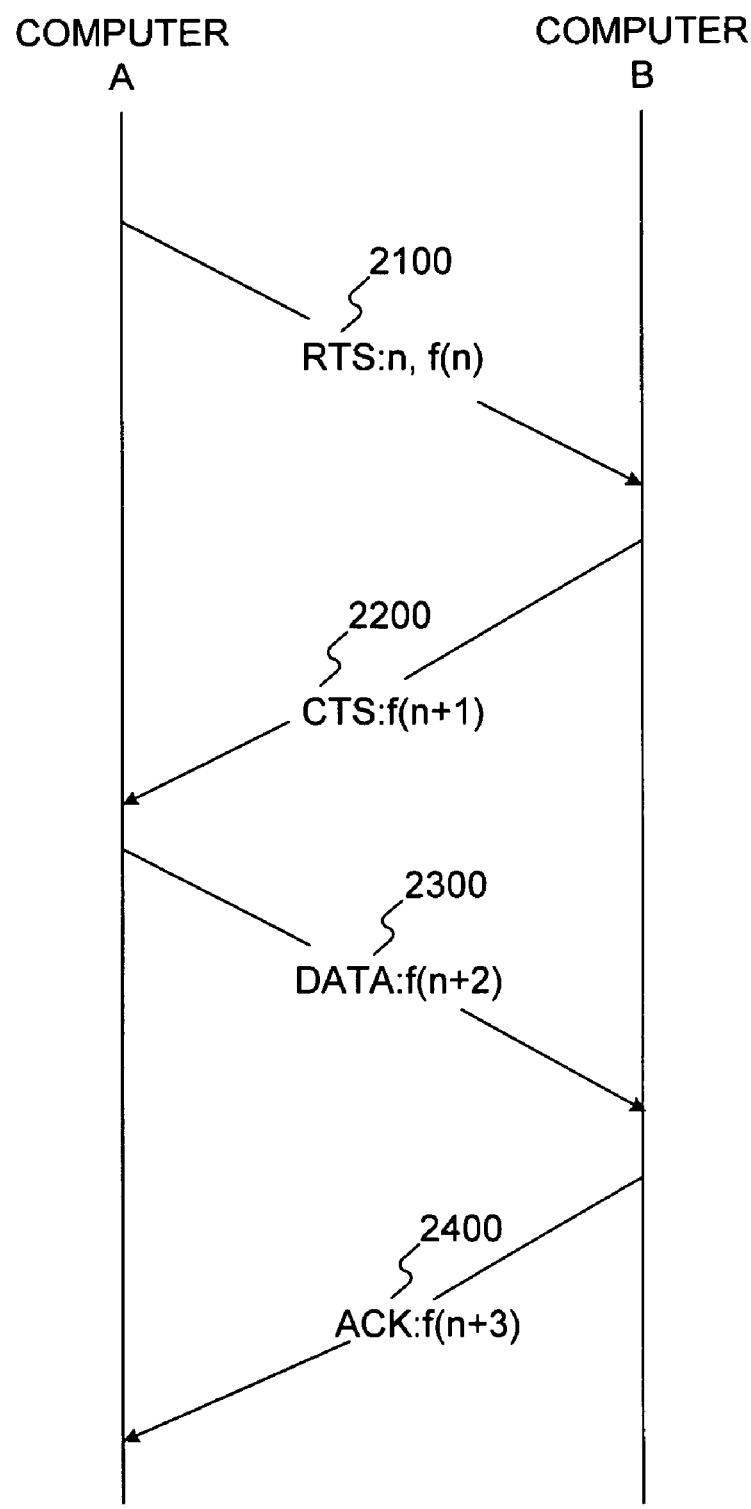
FIG. 6 is a diagram depicting another exemplary message exchange between two computers in accordance with systems and methods consistent with the present invention.

FIG. 6 depicts another exemplary message exchange consistent with the systems and methods of the present invention. In contrast to the exchange of FIG. 3, which described the use of a linear feed back shift register (LFSR) to generate the pseudorandom nonce value, FIG. 4 uses nonce values selected from a database of stored nonce values, with the values being indexed, as described below with respect to FIG. 7.

Figure 7:
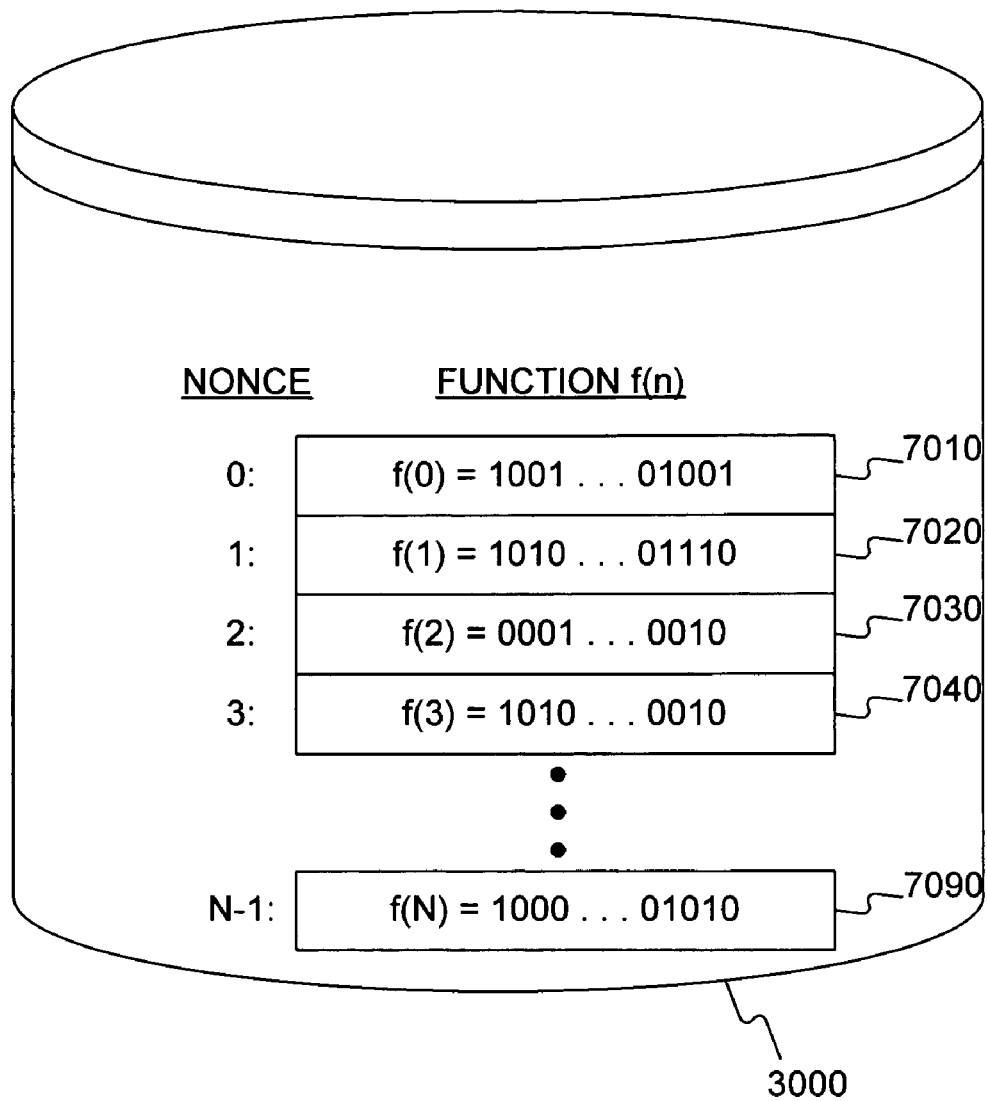
FIG. 7 is an exemplary database storing nonce values and corresponding functions in accordance with systems and methods consistent with the present invention.

FIG. 7 depicts an exemplary database 3000 that stores nonce values n and corresponding functions f(n) of the nonce values. The values of the function f(n) may be any value (e.g., a random number, pseudorandom number, or time value) determined based on the nonce value n. For example, the function f(n) values may represent a cryptographic key determined based on the nonce value n. Moreover, computers A 1451 and B 1450 may each include the same set of nonce values and corresponding functions f(n), which are stored in respective databases 3000 at each of computers A and B. In some embodiments, the nonce values n and corresponding functions f(n) are predetermined and distributed to each of computers A 1451 and B 1450. For example, database 3000 may be stored in a flash memory card and provided to each of computers A and B as a means of authenticating each other during a MAC message exchange. In some embodiments, the flash memory card is embodied as a 128 Megabyte memory and functions as a "one-time-pad" to authenticate the MAC messages 2100-2400.

Referring now to FIGS. 5-7, computer A 1451 sends an RTS message 2100 over wireless network 1200. RTS message 2100 includes a nonce value labeled n (e.g., 0) and the function value f(n) 7010 read from its database (e.g., database 3000). After computer B 1450 receives RTS message 2100, computer B 1450 replies with CTS message 2200 that includes the next table entry in its database (e.g., its copy of database 3000), in this case the table value for f(n+1), e.g., 1010 ... 01110 7020. Computer A 1451 may then send Data message 2300 to computer B 1450. Data message 2300 includes a data payload portion and the next function value f(n+2), e.g., 0001 ... 0010 7030. Computer B then responds with ACK message 2400 that includes the next function value f(n+3), e.g., 1010 ... 0010 7040. By using the nonce values n and corresponding function values in database(s) 3000, computers A and B are better able to authenticate the MAC messages 2100-2400, making it unlikely that computer C 1452 will be able to disrupt communications. Moreover, if a RTS message is received with another nonce value (e.g., 2), the subsequent messages 2200-2400 would use the corresponding functions starting with function f(3) 1010 ... 0010 7040.

Figure 8:
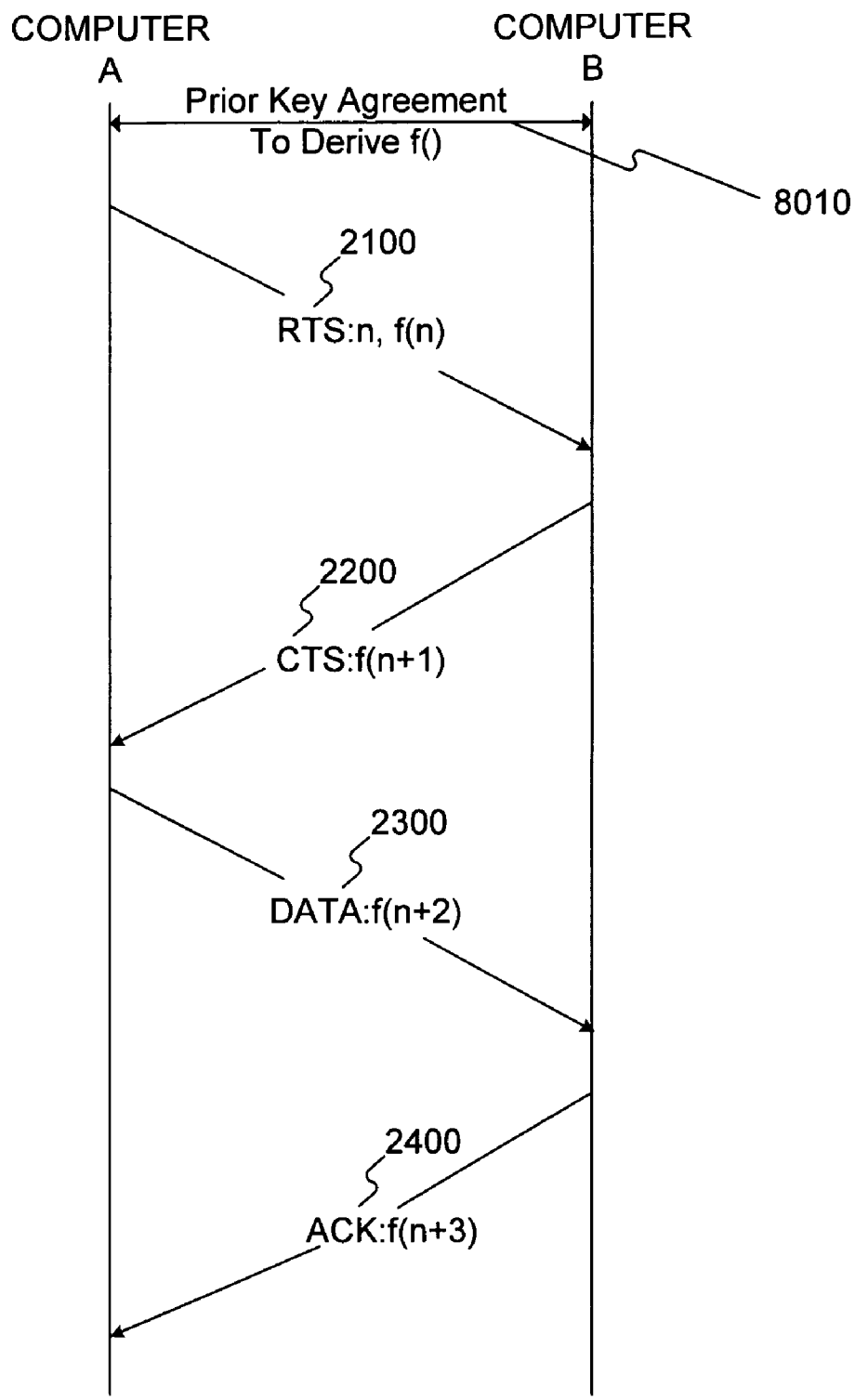
FIG. 8 is a diagram depicting another exemplary message exchange between two computers in accordance with systems and methods consistent with the present invention.

FIG. 8 is similar to the message exchange of FIG. 6 with the additional of a key agreement 8010 between computers A and B before the MAC messages 2100-2400 are exchanged. In some embodiments, for example, computers A and B may use the well-known Diffie-Hellman key exchange to determine shared secret keys. Each of computers A and B then stores the determined shared secret keys along with nonce values that serve as an index for the stored shared secret keys. The shared secret keys may be stored in database(s) 3000 as function values 7010-7090.

One of ordinary skill will recognize that well-known algorithms can be used to exchange and/or calculate a secret cryptographic key. Such algorithms may include the Diffie-Hellman key exchange, which is described in RFC-2412, titled "The OAKLEY Key Determination Protocol," November 1998, and the Internet Key Exchange (IKE), which is described in RFC-2409, November 1998. Moreover, other well-known cryptographic key algorithms may by used including one or more of the following: an extended Diffie-Hellman algorithm, a Hughes variant of the Diffie-Hellman algorithm, a Shamir's Three-Pass protocol, a COMSET algorithm, an Encrypted Key Exchange algorithm, or a Fortified Key Negotiation algorithm.

Figure 9:
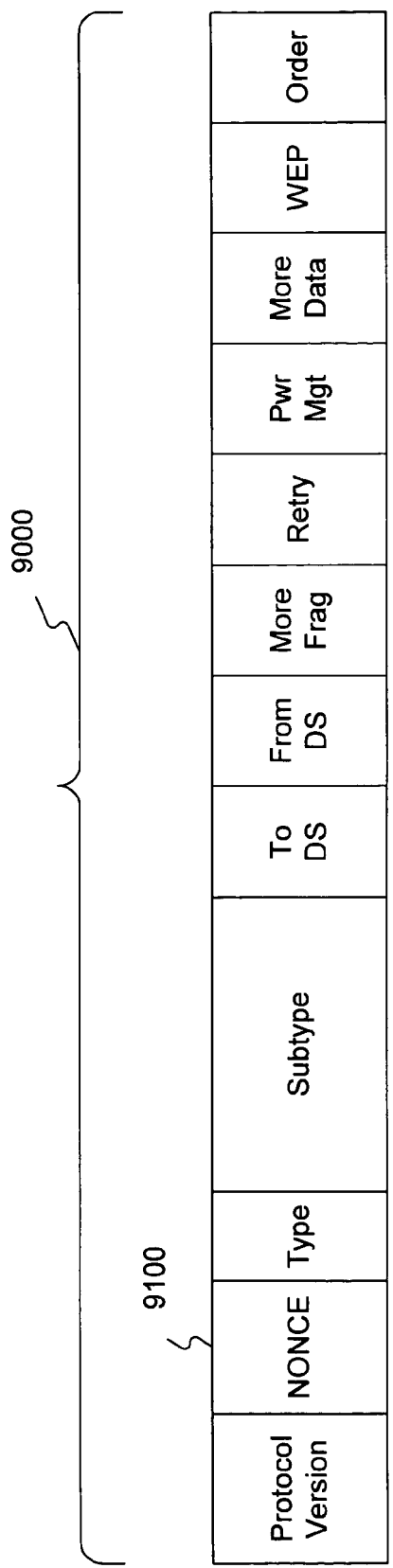
FIG. 9 is an exemplary Data message in accordance with systems and methods consistent with the present invention.
Figure 10:
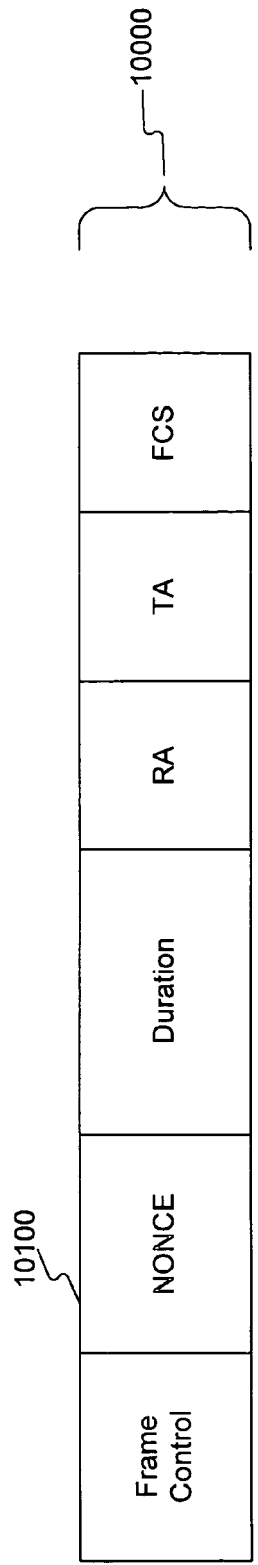
FIG. 10 is an exemplary Request to Send (RTS) message in accordance with systems and methods consistent with the present invention.
Figure 11:
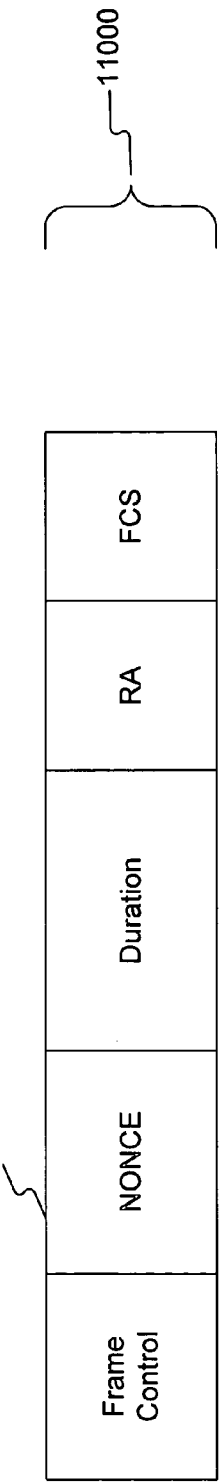
FIG. 11 is an exemplary Clear to Send (CTS) message in accordance with systems and methods consistent with the present invention.
Figure 12:
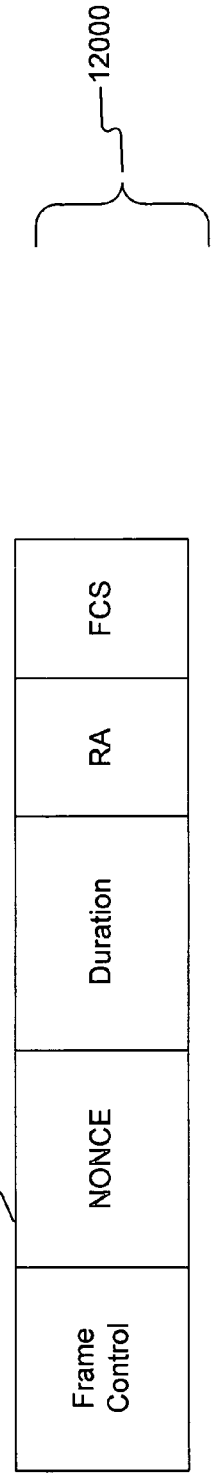
FIG. 12 is an exemplary Acknowledgement (ACK) message in accordance with systems and methods consistent with the present invention.

FIG. 9 depicts an IEEE 802.11-1999 DATA message 9000 (also referred to as a Data frame) modified with the addition of a nonce field 9100. FIG. 10 depicts an exemplary IEEE 802.11-1999 RTS message 10000 modified with the addition of a nonce field 10100. FIG. 11 depicts an exemplary IEEE 802.11-1999 CTS message 11000 modified with the addition of a nonce field 11100. FIG. 12 depicts an exemplary IEEE 802.11-1999 ACK message modified with the addition of a nonce field 11100. In one embodiment, messages 9000-12000 are used as the messages 2100-2400.

Figure 13:
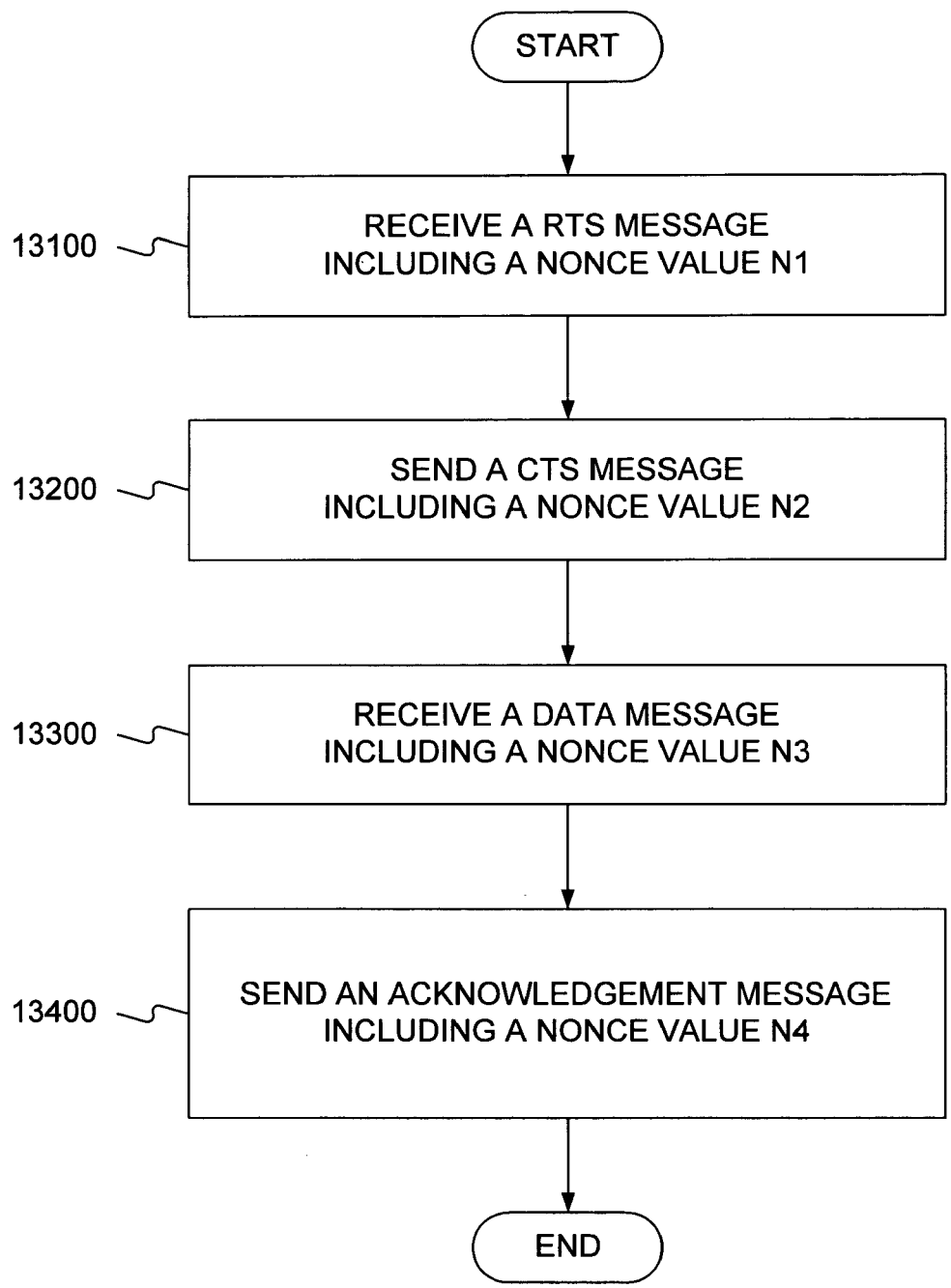
FIG. 13 is a flowchart with exemplary steps for controlling medium access with messages that include nonce values or functions of nonce values in accordance with systems and methods consistent with the present invention.
Figure 14:
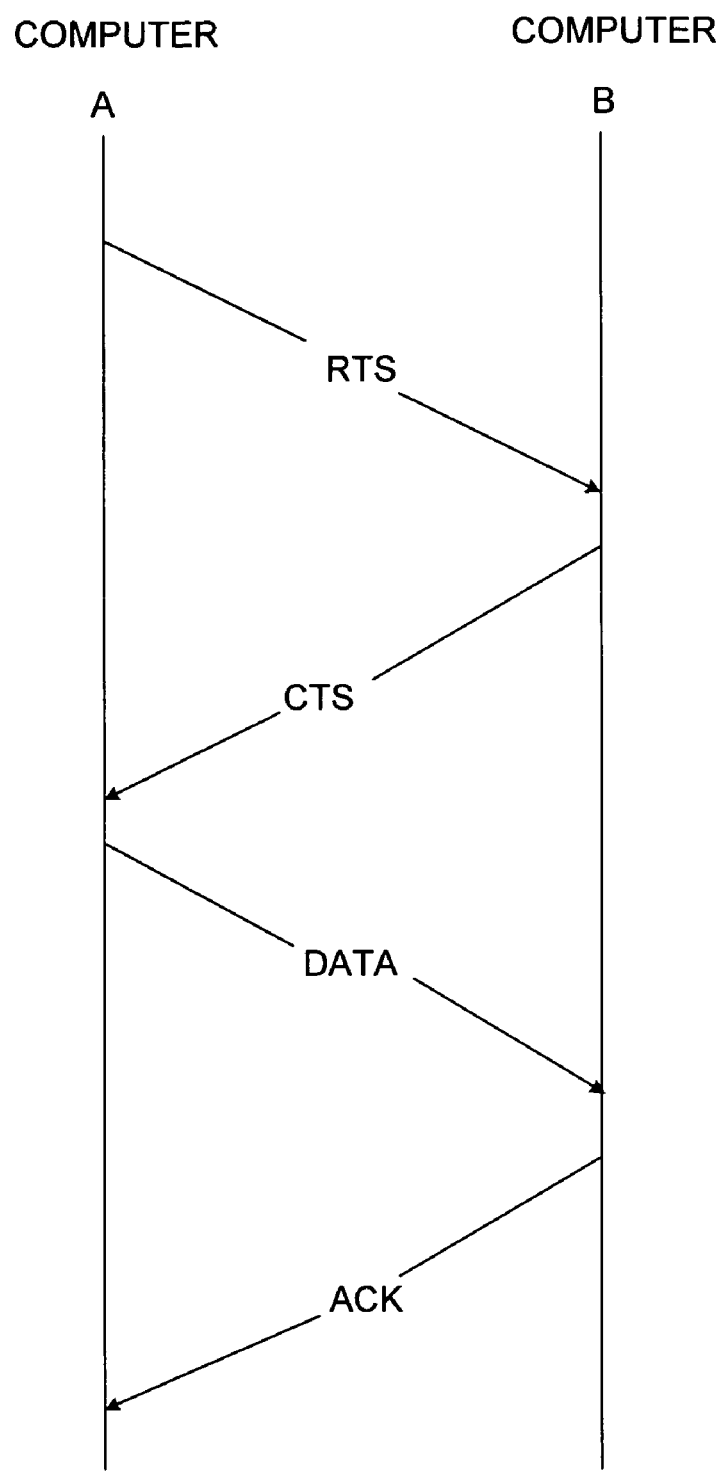
FIG. 14 is a diagram depicting a known message exchange between two computers.

FIG. 13 depicts a flowchart with exemplary steps for including a nonce value (or function thereof) in one or more MAC messages 2100-2400. Referring to FIGS. 2, 5 and 13, after receiving RTS message 2100 that includes a nonce value N1 (step 13100), computer B responds by sending CTS message 2200 with the nonce value N2 (step 13200). Computer B then receives Data message 2300 sent by computer A 1451, with Data message 2300 including the nonce value N3 (step 13300). Computer B then responds to message 2300 by sending ACK message 2400, which also includes the nonce value N4 (step 13400). As noted above, nonce values N1-N4 may be any value or function. Moreover, the nonce values N1-N4 may be the same nonce value or different values.

To send RTS message 2100, computer A 1451 sends RTS message 2100 through network interface 5380 and antenna 5400. RTS message 2100 includes nonce value N1. The RTS message 2100 is received as an RF signal at computer B through an antenna and demodulated by a wireless network interface, such as a wireless network interface card compatible with IEEE 802.11 (step 13100). When RTS message 2100 is received by computer B, it responds by sending CTS message 2200 through a wireless network interface and an antenna (step 13200). CTS message 2200 includes the nonce value N2 received in RTS message 2100.

At computer A 1451, it receives CTS message 2200 sent by computer B as an RF signal which is subsequently demodulated using wireless network interface 5380. CTS message 2200 triggers computer A 1451 to send data Data message(s) 2300. The nonce value N3 included in Data message 2300 may be unencrypted clear text or, alternatively, encrypted. Computer A then forms and sends Data message 2300 through wireless network interface 5380 and antenna 5400, which transmits, e.g., an IEEE 802.11b compatible RF signal.

To receive the computer A Data message 2300 including the nonce value N3 (step 13300), computer B receives an RF signal through an antenna and demodulates the signal at a wireless network interface. Computer B then identifies the nonce value N3 in Data message 2300. If the nonce value N3 is encrypted, computer B 1450 decrypts the nonce value.

Computer B then terminates the message exchange by sending ACK message 2400 including the nonce value N4 (step 13400). Computer B sends ACK message 2400 through a network interface and an antenna. ACK message 2400 represents that computer B has granted wireless media access to computer A 1451, enabling computer B to decrypt, process Data message 2400, and/or forward Data message 2400 to network 1205. In some embodiments, computer B is embodied as a wireless access point in an IEEE 802.11 network. When that as the case, computer B functions as a gateway accepting Data messages from computer A 1451 and forwarding the Data message (or data payload) to a destination computer or network, such as network 1205.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Furthermore, although the above description has referred to embodiments in a wireless network environment based on radio frequency (RF) transmission, systems and methods consistent with the present invention may be employed in other forms of wireless networks, e.g., those based on optical or acoustic transmissions, or in any other network in which messages are exchanged as a part of the medium access control for that network.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A method of medium access control comprising:
   receiving a first message including a first integer;
   sending a second message including a second integer, the second message sent in response to the first message;
   receiving, in response to the second message, a third message including data and a third integer, the third integer serving to authenticate the third message;
   sending, in response to the third message, a fourth message including a fourth integer, the fourth message serving to acknowledge receipt of the third message; and
   using, as the first, second, third, and fourth integers, the same value.

2. The method of claim 1, further comprising:
   using, as the same value, a random integer.

3. The method of claim 1, further comprising:
   using, as the same value, a pseudorandom integer.

4. The method of claim 1, further comprising:
   using, as the same value, a time value.

5. The method of claim 1, further comprising:
   using, as the same value, a time value based on a Global Positioning System (GPS).

6. The method of claim 1, further comprising:
   using, as the first integer, a nonce value, the nonce value being based on one or more of the following: a random integer, a pseudorandom integer, or a time value.

7. The method of claim 1, further comprising:
   using, as the first integer, a value that is a function of a nonce value.

8. The method of claim 1, wherein receiving the first message comprises:
   using, as the first message, a request to send message.

9. The method of claim 1, wherein receiving the second message comprises:
   using, as the second message, a clear to send message.

10. The method of claim 1, further comprising:
    using the first, second, third, and fourth messages as the medium access control of a wireless network.

11. The method of claim 1, further comprising:
    using, as the first message, a request-to-send message, the request-to-send message providing media access control.

12. A method of medium access control in a wireless network comprising:
    receiving a request to send message, the request to send message including a first integer;
    sending, in response to the received request to send message, a clear to send message including the first integer and a second integer;
    receiving, in response to the clear to send message, a data message including the second integer, the second integer serving to authenticate the data message;
    sending, in response to the received data message, an acknowledgement message including the first integer; and
    using, as the first and second integers, the same value.

13. A system of medium access control in a wireless network comprising:
    means for receiving a request to send message, the request to send message including a first integer;
    means for sending, in response to the received request to send message, a clear to send message including the first integer and a second integer;
    means for receiving, in response to the clear to send message, a data message including the second integer, the second integer serving to authenticate the data message; and
    means for sending, in response to the received data message, an acknowledgement message including the first integer, wherein the same value is used for the first and second integers.

14. A system of medium access control comprising:
    means for receiving a first message including a first integer;
    means for sending a second message including a second integer, the second message sent in response to the first message;
    means for receiving a third message, in response to the second message, including data and a third integer, the third integer serving to authenticate the third message; and
    means for sending, in response to the third message, a fourth message including a fourth integer, the fourth message serving to acknowledge receipt of the third message, wherein the same value is used for the first, second, third, and fourth integers.

15. A system for medium access control, the system comprising:
    a processor; and
    a memory,
    wherein the processor and the memory are configured to perform a method comprising:
      receiving a first message including a first integer;
      sending a second message including a second integer, the second message sent in response to the first message;
      receiving, in response to the second message, a third message including data and a third integer, the third integer serving to authenticate the third message;
      sending, in response to the third message, a fourth message including a fourth integer, the fourth message serving to acknowledge receipt of the third message;
      using, as the first, second, third, and fourth integers, the same value.

16. The system of claim 15, further comprising:
    using, as the same value, a random integer.

17. The system of claim 15, further comprising:
    using, as the same value, a pseudorandom integer.

18. The system of claim 15, further comprising:
    using, as the same value, a time value.

19. The system of claim 15, further comprising:
    using, as the same value, a time value based on a Global Positioning System (GPS).

20. The system of claim 15, further comprising:
    using, as the first integer, a nonce value, the nonce value being based on one or more of the following: a random integer, a pseudorandom integer, or a time value.

21. A system for medium access control in a wireless network,
    the system comprising:
    a processor; and
    a memory,
    wherein the processor and the memory are configured to perform a method comprising:
      receiving a request to send message, the request to send message including a first integer;

sending, in response to the received request to send message, a clear to send message including the first integer and a second integer;

receiving, in response to the clear to send message, a data message including the second integer, the second integer serving to authenticate the data message; and sending, in response to the received data message, an acknowledgement message including the first integer, wherein the same value is used for the first and second integers.

22. A computer-readable storage medium containing instructions which, when executed on a data processor, cause the data processor to perform a method of medium access control, the method comprising:

receiving a first message including a first integer;

sending a second message including a second integer, the second message sent in response to the first message;

receiving, in response to the second message, a third message including data and a third integer, the third integer serving to authenticate the third message;

sending, in response to the third message, a fourth message including a fourth integer, the fourth message serving to acknowledge receipt of the third message; and using, as the first, second, third, and fourth integers, the same value.

23. A computer-readable storage medium containing instructions which, when executed on a data processor, cause the data processor to perform a method of medium access control in a wireless network, the method comprising:

receiving a request to send message, the request to send message including a first integer;

sending, in response to the received request to send message, a clear to send message including the first integer and a second integer;

receiving, in response to the clear to send message, a data message including the second integer, the second integer serving to authenticate the data message;

sending, in response to the received data message, an acknowledgement message including the first integer; and using, as the first and second integers, the same value.

* * * * *